(12) United States Patent
Schütz

(10) Patent No.: US 7,490,621 B2
(45) Date of Patent: Feb. 17, 2009

(54) METHOD FOR PRODUCING A TAPPING VALVE FORMED AS A PLASTIC INJECTION-MOLDED PART FOR PLASTIC OR METAL SHIPPING AND STORAGE TANKS FOR LIQUIDS

(75) Inventor: Udo Schütz, Selters/Westerwald (DE)

(73) Assignee: Protechna S.A., Fribourg (CH)

( * ) Notice: Subject to any disclaimer, the term of this patent is extended or adjusted under 35 U.S.C. 154(b) by 455 days.

(21) Appl. No.: 11/203,663

(22) Filed: Aug. 12, 2005

(65) Prior Publication Data
US 2006/0038317 A1   Feb. 23, 2006

(30) Foreign Application Priority Data
Aug. 18, 2004   (DE) ................ 10 2004 039 961

(51) Int. Cl.
*F16K 27/00* (2006.01)
(52) U.S. Cl. ............... 137/15.18; 137/315.01; 137/315.18; 264/250
(58) Field of Classification Search ............ 137/15.18, 137/15.22, 315.17, 315.18, 315.16, 315.01; 264/242, 250–256
See application file for complete search history.

(56) References Cited

U.S. PATENT DOCUMENTS
5,551,467 A * 9/1996 Booth et al. ............ 251/315.05

FOREIGN PATENT DOCUMENTS
DE   103 01 517   3/2004

* cited by examiner

*Primary Examiner*—Kevin L Lee
(74) *Attorney, Agent, or Firm*—Friedrich Kueffner

(57) ABSTRACT

A method for producing a tapping valve formed as a plastic injection-molded part for plastic or metal shipping and storage tanks for liquids, wherein, in a first process step, the screw cap for screwing the valve onto the outlet connection of a liquid tank is produced in a first injection mold, the screw cap is then placed in a second injection mold, and in a second process step, the valve body is produced in the second injection mold in such a way that the inlet connection of the valve body passes through the opening of the ring shoulder and the threaded hole of the screw cap with clearance, and the collar of the inlet connection of the valve body is located inside the screw cap. In a second method, the valve body and its inlet connection are injection-molded as separate parts in a first process step, and in a second process step, the inlet connection, with a screw cap slipped onto it, is welded onto the valve body.

4 Claims, 2 Drawing Sheets

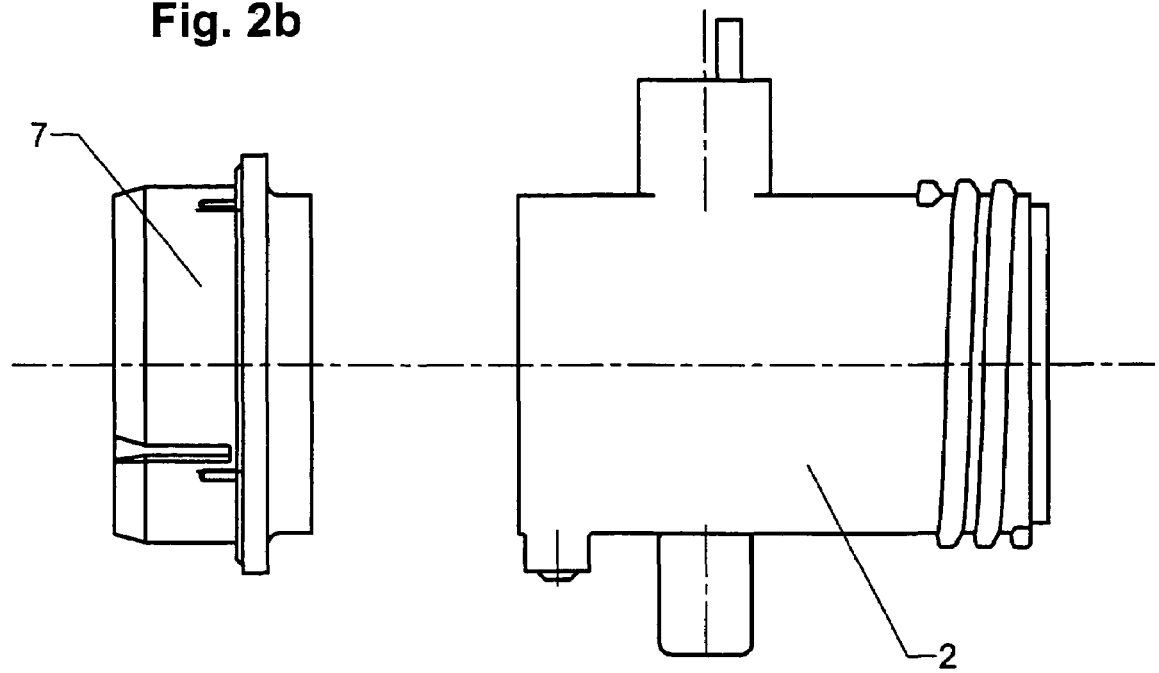
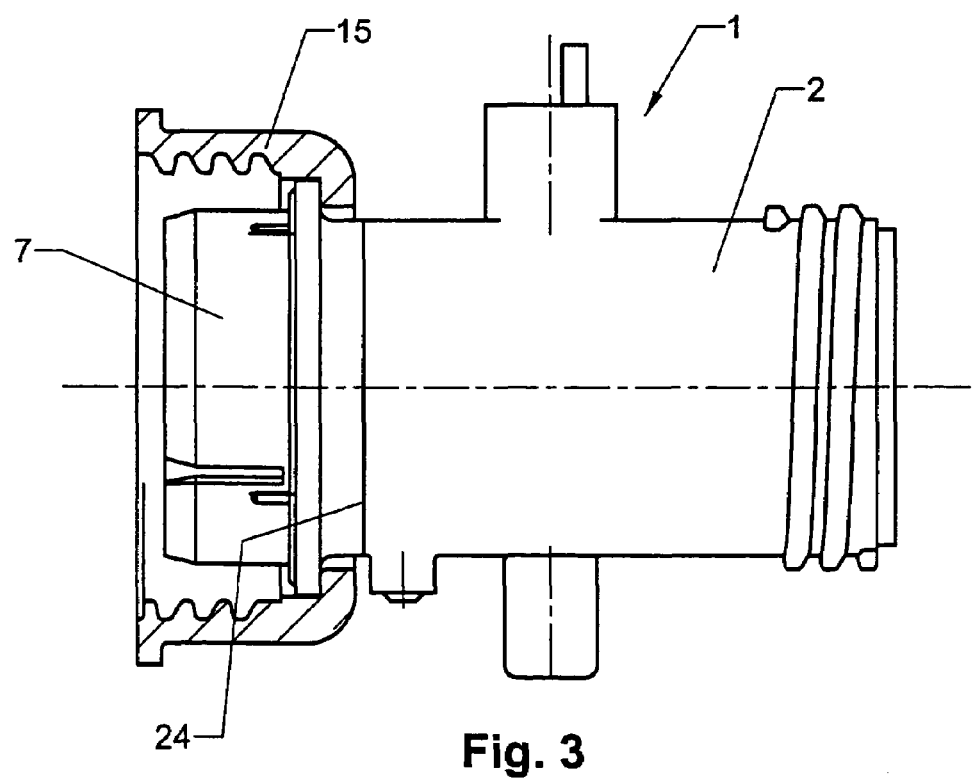

METHOD FOR PRODUCING A TAPPING VALVE FORMED AS A PLASTIC INJECTION-MOLDED PART FOR PLASTIC OR METAL SHIPPING AND STORAGE TANKS FOR LIQUIDS

BACKGROUND OF THE INVENTION

1. Field of the Invention

The present invention relates to a method for producing a tapping valve formed as a plastic injection-molded part, especially a flap valve or ball valve, for plastic or metal shipping and storage tanks for liquids, with a valve body, which has an outlet connection and an inlet connection with a screw cap that serves the purpose of screwing the valve body onto the externally threaded outlet connection of the liquid tank and is captively held and movable on the inlet connection between a collar of the inlet connection and the support studs of the valve body for the rotating shaft of the valve closing element.

2. Description of the Related Art

DE 103 01 517 B3 describes a shipping and storage tank for liquids with an inner plastic tank that stands on a pallet-like frame and an outer latticed jacket. The tapping valve of the inner tank is screwed onto the outlet connection of the inner tank by means of a plastic screw cap, which is captively mounted on the inlet connection of the valve and is welded together from two cap halves on the inlet connection. When the screw cap is made of aluminum, the two halves of the cap are riveted together on the inlet connection of the tapping valve. This type of captive mounting of a screw cap on the inlet connection of a tapping valve is complicated and time-consuming and increases manufacturing costs.

SUMMARY OF THE INVENTION

The object of the invention is to develop a cost-effective method for producing a tapping valve formed as a plastic injection-molded part for liquid tanks made of plastic or metal with a valve body that has an inlet connection with a screw cap that serves the purpose of screwing the valve body onto the externally threaded outlet connection of the liquid tank and is captively held on the inlet connection.

In accordance with the invention, this object is met by production methods in which, in a first process step, the screw cap for screwing the valve onto the outlet connection of a liquid tank is produced in a first injection mold, the screw cap is then placed in a second injection mold, and in a second process step, the valve body is produced in the second injection mold in such a way that the inlet connection of the valve body extends through the opening of the ring shoulder and the threaded hole of the screw cap with clearance, and the collar of the inlet connection of the valve body is located inside the screw cap.

In a second method, the valve body and its inlet connection are injection-molded as separate parts in a first process step, and in a second process step, the inlet connection, with a screw cap slipped onto it, is welded onto the valve body.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIGS. 2a and 2b are side views of the valve body and inlet connection of a flap valve, which are produced as plastic injection-molded parts.

FIG. 3 is a side view of a flap valve, whose body and inlet connection are welded together according to the second method, with the screw cap mounted.

DESCRIPTION OF THE INVENTION

Figure 1:
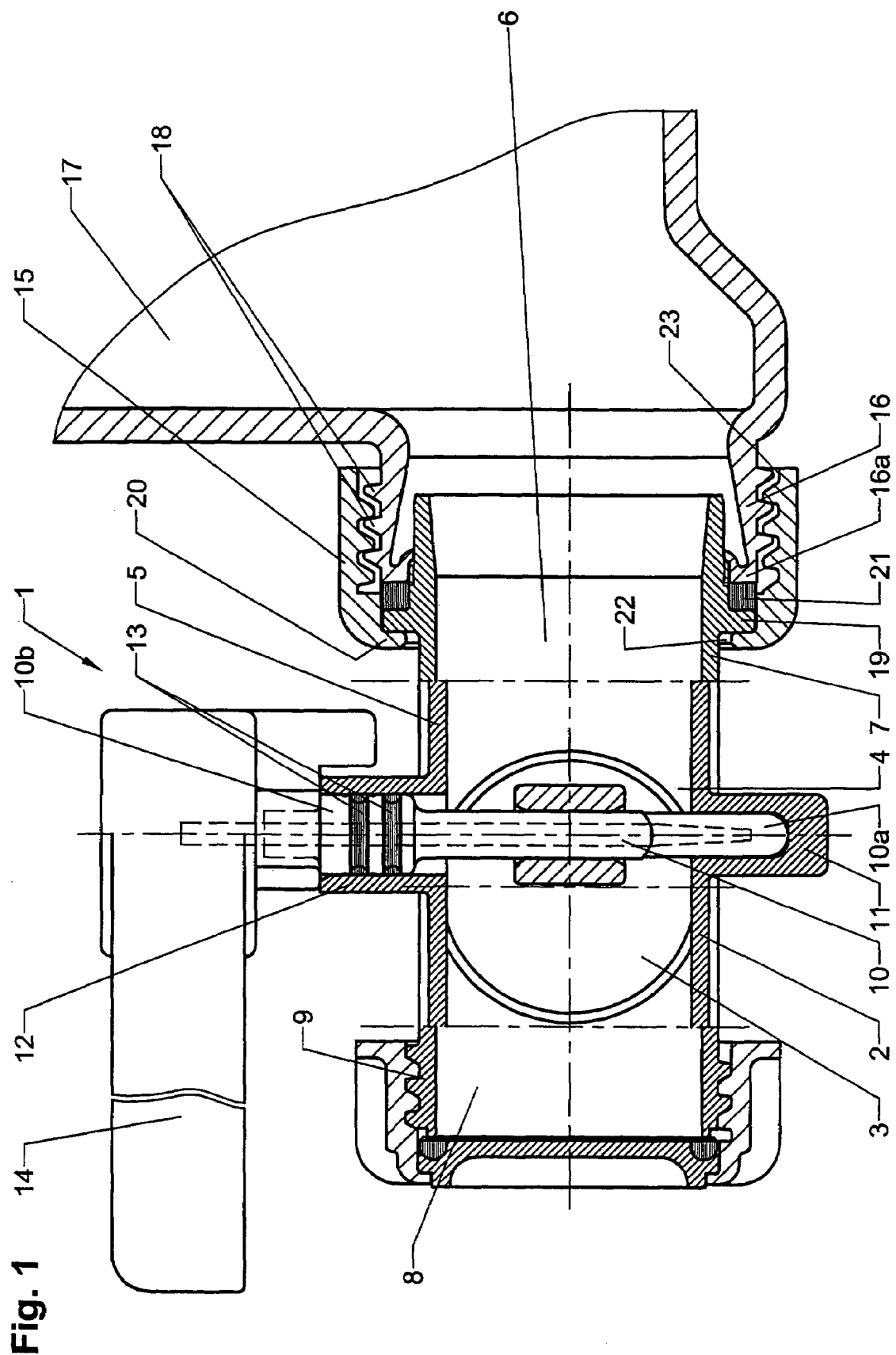
FIG. 1 is a longitudinal section of a flap valve produced by the first method according to the invention.

The HDPE (high-density polyethylene) valve body 2 of the flap valve 1 holds a flap disk 3 for opening and closing the central flow passage 4 of the body chamber 5, which communicates with the inlet channel 6 of the inlet connection 7 and with the outlet channel 8 of the outlet connection 9 of the valve body 2. The flap disk 3 is eccentrically mounted on a rotating shaft 10, whose two ends 10a, 10b are rotatably supported in support studs 11, 12 of the valve body 2, and the upper end 10b of the rotating shaft 3 extends out of the valve body 2 beyond the support stud 12. The rotating shaft 10 is sealed towards the outside by gaskets 13 in the support stud 12. A handle 14 for opening and closing the flap valve 1 is mounted on the end 10b of the rotating shaft 10 of the flap disk 3 that extends from the valve body 2.

The flap valve 1 is mounted on the outlet connection 16 of a liquid tank 17, e.g., a plastic inner tank of a pallet tank, by means of a plastic screw cap 15. The liquid tank 17 is produced by blow molding as a single part with the outlet connection 16, which has an external thread 18.

The screw cap 15 is captively and movably held on the inlet connection 7 of the valve body 2 between a collar 19 of the inlet connection 7 and the support studs 11, 12 of the valve body 2 for the rotating shaft 10 of the flap disk 3.

When the inlet connection 7 of the valve body 2 is pulled into the outlet connection 16 of the liquid tank 17 by screwing on the screw cap 15, which is captively held on the inlet connection 7 of the valve body and has a ring shoulder 20 that contacts the collar 19 of the inlet connection 7, a gasket 21 seated on the inlet connection 7 is clamped between the collar 19 and the outer end 16a of the liquid tank 17 and thus seals the valve body 2 of the flap valve 1 from the liquid tank 17.

To produce the flap valve 1 with the screw cap 15, which is captively held on the inlet connection 7 of the valve body 2, in a first process step, the screw cap 15 is produced in a first injection mold. The finished screw cap 15 is then placed in a second injection mold, and in a second process step, the valve body 2 is produced in such a way that the inlet connection 7 of the valve body 2 passes through the opening 22 of the ring shoulder 20 and the threaded hole 23 of the screw cap 15 with clearance, and the collar 19 of the inlet connection 7 of the valve body 2 is located inside the screw cap 15.

A second method for producing the flap valve 1 with the screw cap 15 is characterized by the fact that in a first process step, the valve body 2 and its inlet connection 7 are injection-molded as separate parts, and in a second process step, the inlet connection 7, with a screw cap 15 slipped onto it, is welded onto the place on the valve body 2 that is labeled with reference number 24 in FIG. 3.

The valve body 2 and screw cap 15 of the flap valve 1 are manufactured from various plastic materials in accordance with the required strength characteristics.

While specific embodiments of the invention have been shown and described in detail to illustrate the inventive principles, it will be understood that the invention may be embodied otherwise without departing from such principles.

I claim:

1. A method for producing a tapping valve formed as a plastic injection-molded part for plastic or metal shipping and storage tanks for liquids, with a valve body, which has an externally threaded outlet connection and an inlet connection with a screw cap for screwing the valve body onto the externally threaded outlet connection of the liquid tank, the screw cap being captively held and movable on the inlet connection between a collar of the inlet connection and support studs of the valve body for a rotating shaft of a valve closing element, the method comprising in a first process step, producing the screw cap in a first injection mold, then placing the screw cap in a second injection mold, and in a second process step, the producing of the valve body in the second injection mold such that the inlet connection of the valve body extends through an opening of a ring shoulder and a threaded hole of the screw cap with clearance, wherein the collar of the inlet connection of the valve body is located inside the screw cap.

2. The method in accordance with claim 1, wherein the valve body and the screw cap are manufactured from plastic materials.

3. A method for producing a tapping valve formed as a plastic injection-molded part, for plastic or metal shipping and storage tanks for liquids, with a valve body, which has an externally threaded outlet connection and an inlet connection with a screw cap for screwing the valve body onto the externally threaded outlet connection of the liquid tank, the screw cap being captively held and movable on the inlet connection between a collar of the inlet connection and support studs of the valve body for a rotating shaft of a valve closing element, the method comprising in a first process step, injection-molding the valve body and the inlet connection as separate parts, and in a second process step, welding the inlet connection, with a screw cap slipped onto it, onto the valve body.

4. The method in accordance with claim 3, wherein the valve body and the screw cap are manufactured from plastic materials.

* * * * *